United States Patent
Matityahu et al.

(10) Patent No.: US 7,486,625 B2
(45) Date of Patent: Feb. 3, 2009

(54) COMMUNICATIONS NETWORK TAP WITH LINK FAULT DETECTOR

(75) Inventors: Eldad Matityahu, Palo Alto, CA (US); Robert E. Shaw, Los Gatos, CA (US); Stephen H. Strong, Fremont, CA (US)

(73) Assignee: Net Optics, Inc., Sunnyvale, CA (US)

( * ) Notice: Subject to any disclaimer, the term of this patent is extended or adjusted under 35 U.S.C. 154(b) by 600 days.

(21) Appl. No.: 11/174,032

(22) Filed: Jul. 1, 2005

(65) Prior Publication Data
US 2007/0002754 A1    Jan. 4, 2007

(51) Int. Cl.
H04J 3/14    (2006.01)
(52) U.S. Cl. ............................... 370/242; 370/248
(58) Field of Classification Search ......... 370/216–228, 370/242–246, 248–249
See application file for complete search history.

(56) References Cited
U.S. PATENT DOCUMENTS

| | | | | |
|---|---|---|---|---|
| 6,041,037 A | * | 3/2000 | Nishio et al. | 370/228 |
| 6,167,025 A | * | 12/2000 | Hsing et al. | 370/216 |
| 6,449,247 B1 | * | 9/2002 | Manzardo et al. | 370/216 |
| 2001/0040870 A1 | * | 11/2001 | Ohmori et al. | 370/216 |
| 2002/0176355 A1 | * | 11/2002 | Mimms et al. | 370/216 |
| 2003/0112760 A1 | * | 6/2003 | Puppa et al. | 370/241.1 |

* cited by examiner

Primary Examiner—Chi H Pham
Assistant Examiner—Ahmed Elallam
(74) Attorney, Agent, or Firm—IP Strategy Group, P.C.

(57) ABSTRACT

A communications network tap with a link fault detector, comprises a first terminal and a second terminal adapted to couple the tap in-line in the network and communicate data packets with network devices. A tap circuit is coupled to the first terminal and second terminal and configured to provide data packets to a monitor terminal. A link fault circuit coupled to the first terminal and second terminal and when a failure is detected in the first terminal, to cause a failure on the second terminal. Advantages of the invention include ensuring the integrity of the network by alerting network devices of fault conditions.

20 Claims, 2 Drawing Sheets

COMMUNICATIONS NETWORK TAP WITH LINK FAULT DETECTOR

FIELD

The present invention relates to a communications network tap with a link fault detector.

BACKGROUND

Telecommunications networks are important for providing global data and voice communication. Monitoring the networks is important to ensure reliable operation, fault detection, timely mitigation of potentially malicious activities and more. Network taps are known for connecting to networks and providing a port to monitor the communication traffic on the network. Network monitors are known for providing information to other network elements.

In order to maintain the integrity of network monitors, it is important to implement a fault detection technique where network components can signal an alarm in the event of a fault in another component. This is important because a faulty component may not provide a reliable alarm signal, for example, if the power supply fails and the component is without power to provide the alarm. In addition, when a network tap is inserted into a communications network, a failure in one link does not alert the active network devices on other links that a destination device may be inoperable. This results in a blind fault condition and may result in a network device continuously attempting communication with an inoperable device; as a result, the network may be fed with data packets that are never delivered to the intended destination.

What is needed is a network component employing a network link fault detector that provides integrity for signaling the fault of other network components so that the data packets can be re-routed to properly arrive at an intended destination.

SUMMARY

The present invention provides a network tap employing a network link fault detector that provides integrity for signaling the fault of other network components so that the data packets can be re-routed to properly arrive at an intended destination.

A communications network tap with a link fault detector, comprises a first terminal and a second terminal adapted to couple the tap in-line in the network and communicate data packets with network devices. A tap circuit is coupled to the first terminal and second terminal and configured to provide data packets to a monitor terminal. A link fault circuit coupled to the first terminal and second terminal and when a failure is detected in the first terminal, to cause a failure on the second terminal.

In one aspect of the invention a first port is disposed between the first terminal and the tap circuit and link fault circuit, and a second port is disposed between the second terminal and the tap circuit and link fault circuit.

Advantages of the invention include ensuring the integrity of the network by alerting network devices of fault conditions.

DESCRIPTION OF THE DRAWINGS

The foregoing and other features, aspects, and advantages will become more apparent from the following detailed description when read in conjunction with the following drawings, wherein.

DETAILED DESCRIPTION

The invention is described with reference to specific architectures and protocols. Those skilled in the art will recognize that the description is for illustration and to provide the best mode of practicing the invention. The description is not meant to be limiting. For example, reference is made to Ethernet Protocol but other protocols can be used in the invention. Likewise, reference is made to network traffic and packets, while other forms of data and addresses can be used in the invention.

Figure 1:
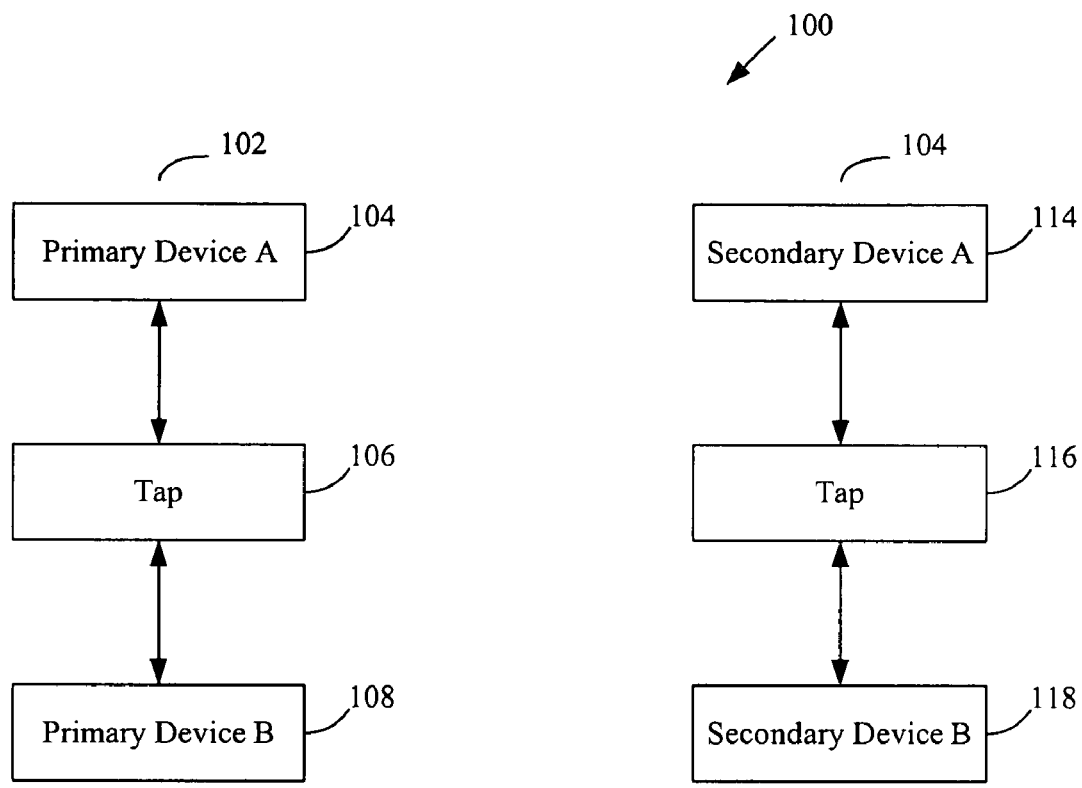
FIG. 1 depicts a network tap in a communications network according to an embodiment of the invention.

FIG. 1 depicts a communication network 100 including a primary path 102 and a secondary path 104. The primary path 102 includes primary device A 104, in-line tap 106 and primary device B 108. The secondary path 104 includes secondary device A 114, in-line tap 116 and secondary device B 118. These network devices are, for example, a switch and a router, but can also represent other types of network devices, server computers, client computers and so forth. The taps 106, 116 are disposed in-line between the network devices and are configured to communicate bi-directionally with each of the devices.

The invention provides network tap 106, 116 with a link fault detector such that a fault between the tap and device B causes the failure of the tap to alert device A. For example, a failure of the link between tap 106 and primary device B 108, causes the tap 106 to fail the link between the tap 106 and primary device A 104. Likewise, a failure of the link between tap 116 and secondary device B 118, causes the tap 116 to fail the link between the tap 116 and secondary device A 114. In this manner, device A is alerted to the failure of device B.

Figure 2:
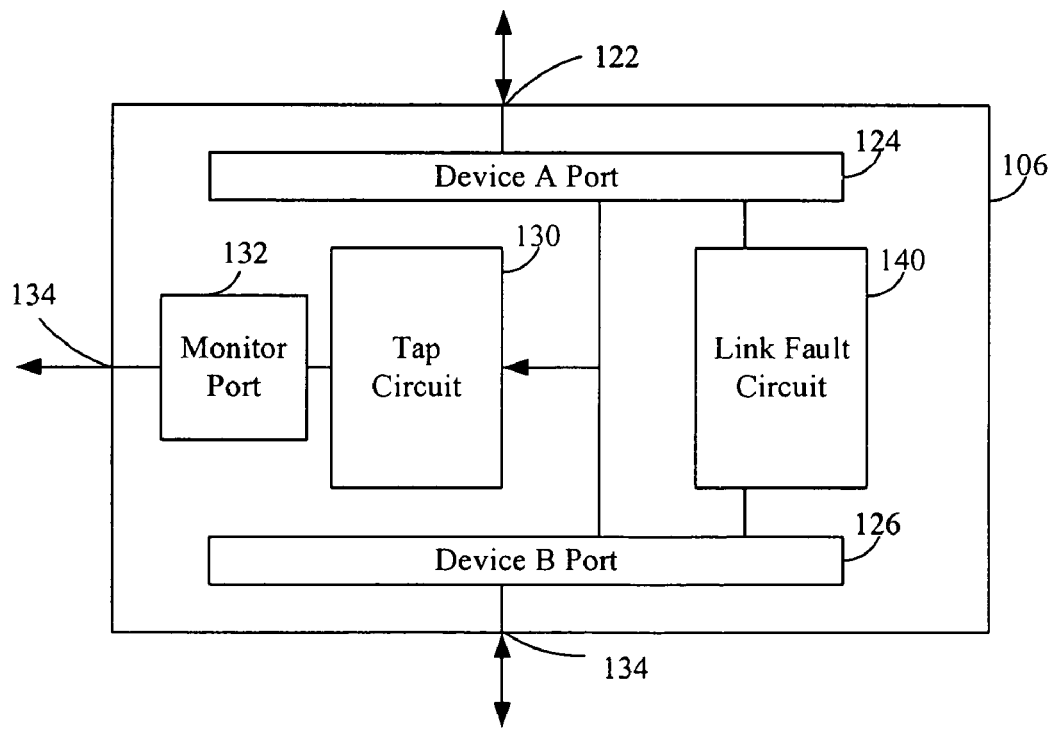
FIG. 2 depicts a network tap with a link fault detector according to an embodiment of the invention.
Figure 3:
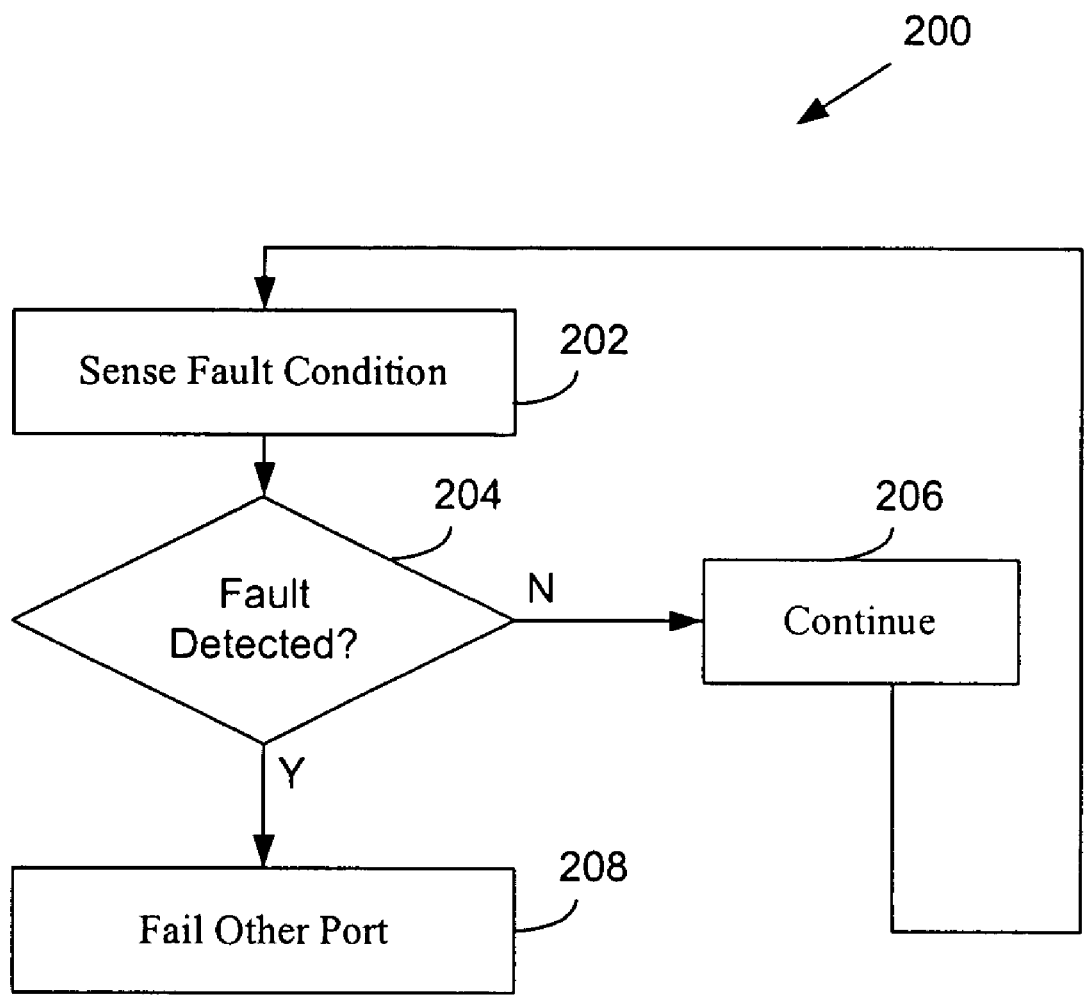
FIG. 3 is a flowchart showing a method according to an embodiment of the invention.

FIG. 2 depicts a network tap 106 with a link fault detector according to an embodiment of the invention. The network tap includes a first terminal 122 and a second terminal 134 to communicate with the network devices. A device A port 124 is coupled to the first terminal and device B port 126 is coupled to the second terminal. A tap circuit is coupled to device port A and device port B and configured to provide data packets to a monitor port 132 and monitor terminal 134. An exemplary monitor can be coupled to the tap, for example, an intrusion detection device (IDS), intrusion prevention device (IPS) or other type of monitor.

A link fault circuit 140 is coupled to the first terminal and second terminal via device port A and device port B. When the link fault circuit detects a link failure in the first terminal, the circuit causes a failure on the second terminal.

The failure signal can also perform one or more actions, for example, to turn on an error light on the tap, to send a failure packet to a specific network device at a particular IP address, or other such action. On viewing or receiving the alarm signal, a network administrator can diagnose the situation and remedy the error.

Advantages of the invention include ensuring the integrity of the network by alerting network devices of fault conditions.

Having disclosed exemplary embodiments and the best mode, modifications and variations may be made to the disclosed embodiments while remaining within the subject and spirit of the invention as defined by the following claims.

The invention claimed is:

1. A communications network tap comprising:
   a first terminal and a second terminal for coupling the communications network tap in-line with a first network device and a second network device, respectively, in a network;
   a monitor port:
   a tap circuit coupled to the first terminal and second terminal, the tap circuit configured to provide data packets to a monitor through the monitor port, the monitor being external to the communications network tap; and
   a link fault circuit coupled to the first terminal and second terminal, the link fault circuit configured to cause a failure signal on the second terminal when the link fault circuit detects a failure in the first terminal.

2. The communications network tap of claim 1 further comprising:
   a first port disposed between the first terminal and the tap circuit, the first port further disposed between the first terminal and the link fault circuit; and
   a second port disposed between the second terminal and the tap circuit, the second port further disposed between the second terminal and the link fault circuit.

3. The communications network tap of claim 1 wherein the monitor is an intrusion detection device.

4. The communications network tap of claim 1 wherein the monitor is an intrusion prevention device.

5. The communications network tap of claim 1 further comprising an error light, the failure signal configured to turn on the error light.

6. The communications network tap of claim 1 wherein the failure signal triggers a failure packet to be sent to a predetermined network device at a predetermined IP address, the predetermined network device viewed by a network administrator.

7. The communications network tap of claim 1 wherein the link fault circuit is further configured to fail a link between the communications network tap and the second network device when the failure is detected in the first terminal.

8. The communications network tap of claim 1 wherein the link fault circuit is further configured to fail the second terminal when the failure is detected in the first terminal.

9. The communications network tap of claim 1 wherein the first network device is a switch, and the second network device is a router.

10. The communication network of claim 1 wherein the link fault circuit is further configured to fail the second terminal when the failure is detected in the first terminal.

11. The communication network of claim 1 wherein the first primary device is a switch, and the second primary device is a router.

12. The communication network of claim 1 wherein the first primary device is a server computer, and the second primary device is a client computer.

13. A communication network comprising:
   a first primary device;
   a second primary device;
   a monitor;
   a first tap disposed between the first primary device and the second primary device, the first tap coupled in-line with the first primary device and the second primary device, the first tap further coupled with the monitor, the monitor external to the first tap, the first tap including at least a monitor port, the first tap further including at least a tap circuit configured to receive data from the first primary device and the second primary device, the tap circuit further configured to provide data packets to the monitor through the monitor port, the first tap further including at least a link fault circuit coupled with the first primary device and the second primary device, the link fault circuit configured to, when detecting a failure in a first terminal, cause a failure signal on a second terminal, the first terminal disposed between the first tap and the first primary device, the second terminal disposed between the first tap and the second primary device.

14. The communication network of claim 13 wherein the first tap further includes at least
   a first port disposed between the first terminal and the tap circuit, the first port further disposed between the first terminal and the link fault circuit, and
   a second port disposed between the second terminal and the tap circuit, the second port further disposed between the second terminal and the link fault circuit.

15. The communication network of claim 13 further comprising:
   a first secondary device;
   a second secondary device; and
   a second tap disposed between the first secondary device and the second secondary device, the second tap coupled in-line with the first secondary device and the second secondary device, the second tap including at least a tap circuit configured to receive data from the first secondary device and the second secondary device, the tap circuit further configured to provide second data packets to the monitor, the monitor external to the second tap.

16. The communication network of claim 13 wherein the monitor is an intrusion detection device.

17. The communication network of claim 13 wherein the monitor is an intrusion prevention device.

18. The communication network of claim 13 wherein the first tap further includes at least an error light, the failure signal configured to turn on the error light.

19. The communication network of claim 13 wherein the failure signal triggers a failure packet to be sent to a predetermined network device at a predetermined IP address, the predetermined network device viewed by a network administrator.

20. The communication network of claim 13 wherein the link fault circuit is further configured to fail a link between the first tap and the second primary device when the failure is detected in the first terminal.

* * * * *

(12) INTER PARTES REEXAMINATION CERTIFICATE (0418th)
United States Patent
Matityahu et al.

(10) Number: US 7,486,625 C1
(45) Certificate Issued: Aug. 7, 2012

(54) COMMUNICATIONS NETWORK TAP WITH LINK FAULT DETECTOR

(75) Inventors: Eldad Matityahu, Palo Alto, CA (US); Robert E. Shaw, Los Gatos, CA (US); Stephen H. Strong, Fremont, CA (US)

(73) Assignee: Net Optics, Inc., Sunnyvale, CA (US)

Reexamination Request:
No. 95/001,318, Mar. 2, 2010

Reexamination Certificate for:
Patent No.: 7,486,625
Issued: Feb. 3, 2009
Appl. No.: 11/174,032
Filed: Jul. 1, 2005

(51) Int. Cl.
*H04J 3/14* (2006.01)

(52) U.S. Cl. .................................. 370/242; 370/248
(58) Field of Classification Search ............ None
See application file for complete search history.

(56) References Cited

To view the complete listing of prior art documents cited during the proceeding for Reexamination Control Number 95/001,318, please refer to the USPTO's public Patent Application Information Retrieval (PAIR) system under the Display References tab.

*Primary Examiner* — Christina Y Leung

(57) ABSTRACT

A communications network tap with a link fault detector, comprises a first terminal and a second terminal adapted to couple the tap in-line in the network and communicate data packets with network devices. A tap circuit is coupled to the first terminal and second terminal and configured to provide data packets to a monitor terminal. A link fault circuit coupled to the first terminal and second terminal and when a failure is detected in the first terminal, to cause a failure on the second terminal. Advantages of the invention include ensuring the integrity of the network by alerting network devices of fault conditions.

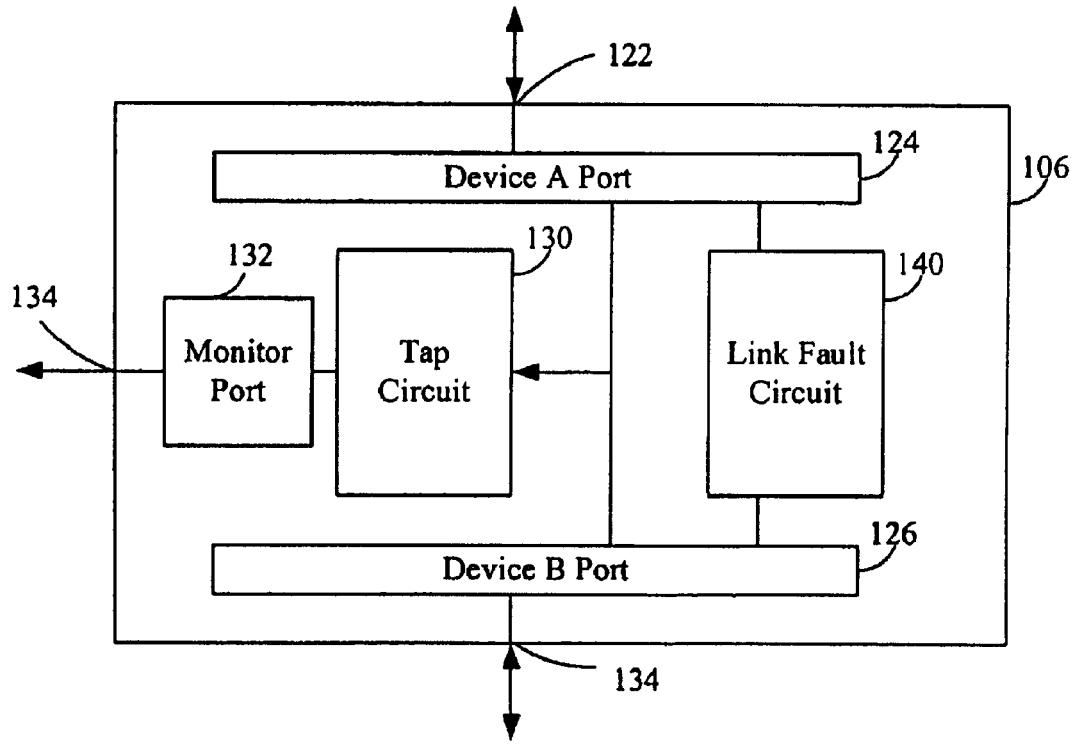

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 13 are determined to be patentable as amended.

Claims 2-12 and 14-20, dependent on an amended claim, are determined to be patentable.

1. A communications network tap comprising:
a first terminal and a second terminal for coupling the communications network tap in-line with a first network device and a second network device, respectively, in a network;
a monitor port;
a tap circuit coupled to the first terminal and second terminal, the tap circuit configured to provide data packets to a monitor through the monitor port, the monitor being external to the communications network tap; and
a link fault circuit coupled to the first terminal and second terminal, the link fault circuit configured to cause a failure signal on the second terminal *and a tap failure condition of the communications network tap for alerting the second network device* when the link fault circuit detects a failure in the first terminal.

13. A communication network comprising:
a first primary device;
a second primary device;
a monitor;
a first tap disposed between the first primary device and the second primary device, the first tap coupled in-line with the first primary device and the second primary device, the first tap further coupled with the monitor, the monitor external to the first tap, the first tap including at least a monitor port, the first tap further including at least a tap circuit configured to receive data from the first primary device and the second primary device, the tap circuit further configured to provide data packets to the monitor through the monitor port, the first tap further including at least a link fault circuit coupled with the first primary device and the second primary device, the link fault circuit configured to, when detecting a failure in a first terminal, cause a failure signal on a second terminal *and a tap failure condition of the first tap for alerting the second primary device*, the first terminal disposed between the first tap and the first primary device, the second terminal disposed between the first tap and the second primary device.

* * * * *